United States Patent [19]

Brown et al.

[11] 4,373,543

[45] Feb. 15, 1983

[54] FIRE RESISTANT SEAT FOR FLOW CONTROL VALVE

[75] Inventors: Robert J. Brown; Kenneth D. Shepherd, both of Cookeville, Tenn.

[73] Assignee: The Duriron Company, Inc., Dayton, Ohio

[21] Appl. No.: 273,165

[22] Filed: Jun. 12, 1981

[51] Int. Cl.³ .............................................. F16K 1/226
[52] U.S. Cl. ..................................... 137/74; 251/306
[58] Field of Search .................... 137/72, 74; 251/306

[56] References Cited

U.S. PATENT DOCUMENTS

| | | | |
|---|---|---|---|
| 3,967,812 | 7/1976 | Newell | 251/306 X |
| 4,083,529 | 4/1978 | Sauty | 251/306 X |
| 4,202,365 | 5/1980 | Aoki | 251/306 X |
| 4,220,172 | 9/1980 | Stager | 137/74 |
| 4,303,249 | 12/1981 | Illy | 251/306 X |
| 4,341,233 | 7/1982 | Broadway | 137/74 X |

Primary Examiner—Harold W. Weakley
Attorney, Agent, or Firm—Biebel, French & Nauman

[57] ABSTRACT

A flow control valve with a valve closure element is provided having at least one annular resilient seat member and an annular flexible metal seat member positioned adjacent to it. The flexible metal seat is held in position by heat resistant gaskets and is biased against the resilient seat member. Upon the failure of the resilient seat to seal because of melting or deterioration caused by exposure to heat, the flexible metal seat member springs into position to provide a fire and heat resistant metal-to-metal seal with the valve closure element.

5 Claims, 6 Drawing Figures

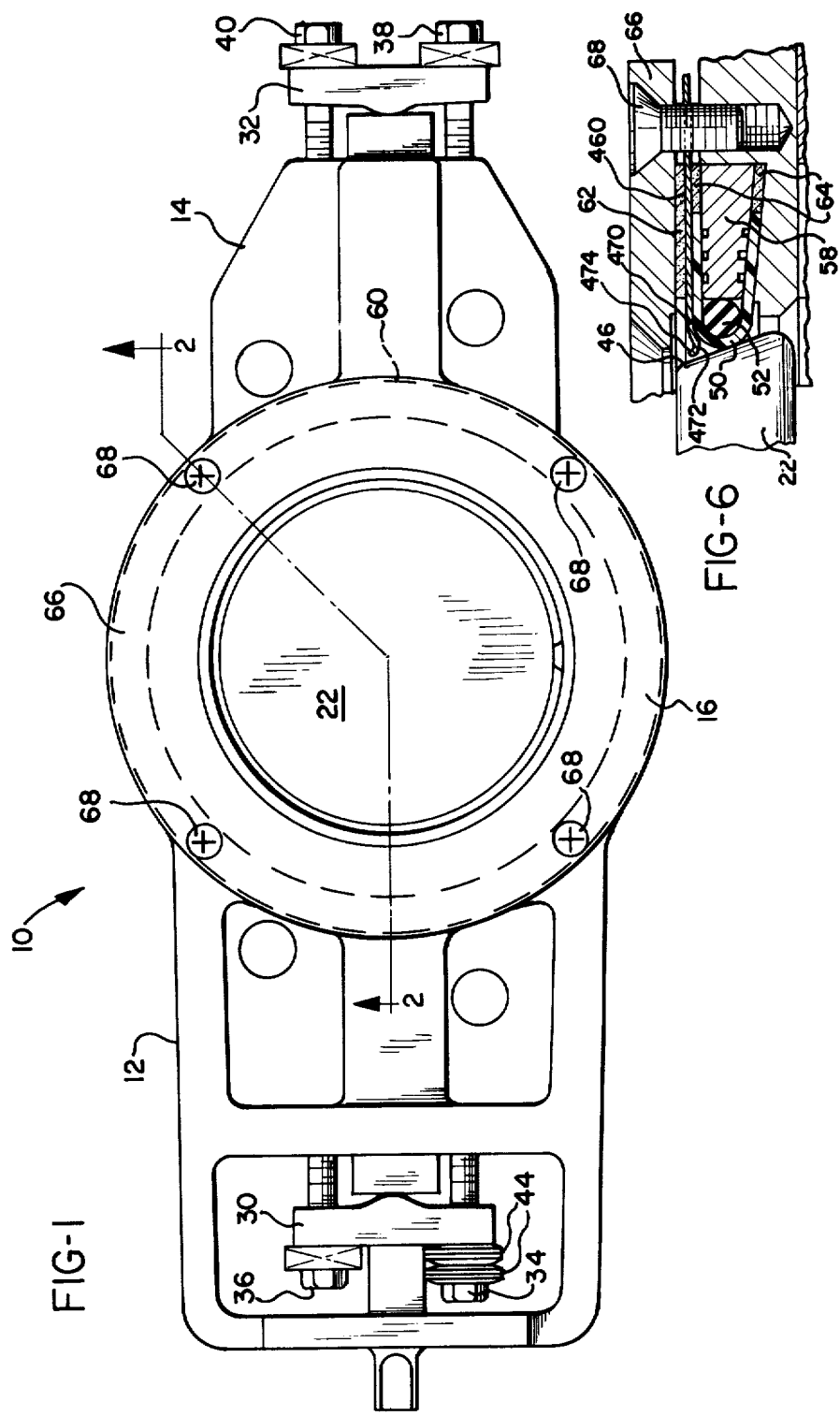

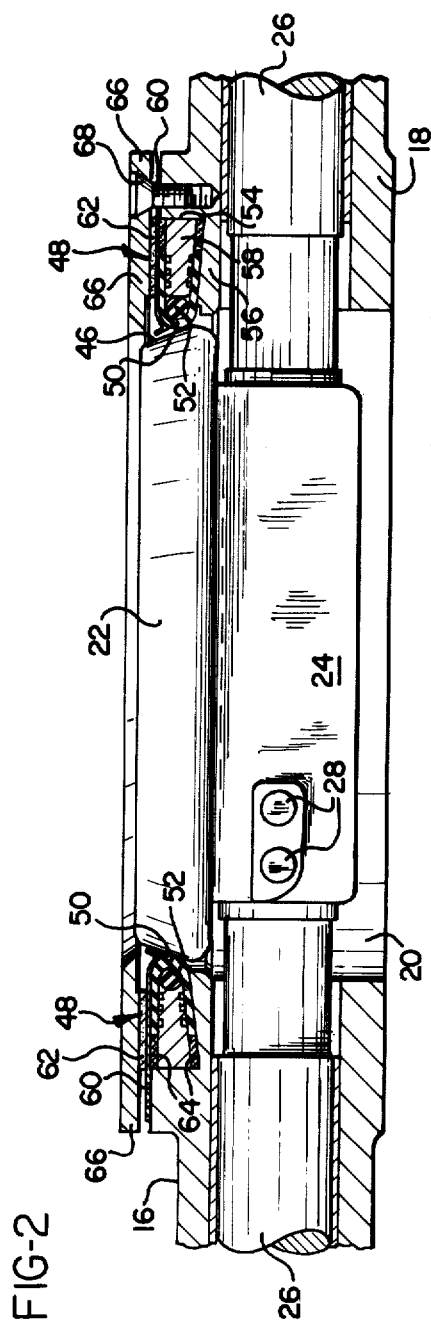
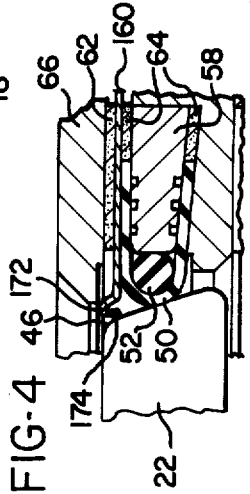
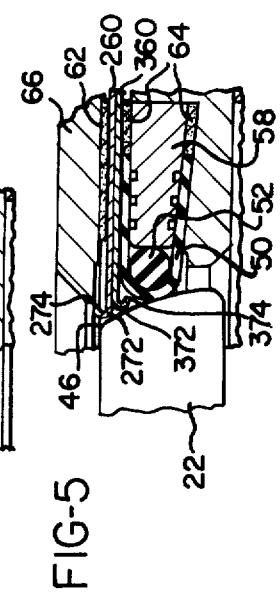
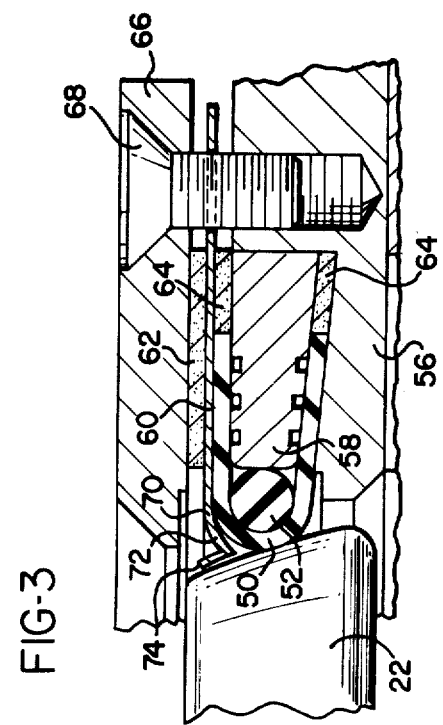

FIRE RESISTANT SEAT FOR FLOW CONTROL VALVE

BACKGROUND OF THE INVENTION

This invention relates to fluid control valves, and in particular to a sealing structure which provides for sealing of such valves in the event of a fire or like occurrence.

Ball valves and butterfly valves used in regulating the flow of fluids commonly incorporate elastomeric sealing elements in their structure. For example, butterfly valves have a circular fluid flow channel therethrough and a circular disc mounted in the flow channel for rotation between an open position in which is substantially parallel to the flow of fluid through the valve and a closed position in which the disc is in a position substantially perpendicular to fluid flow. Typically, the disc edge contacts a relatively soft elastomeric annular seat positioned about the circumference of the fluid flow channel when the valve is in a closed position, and the sealing contact between the disc and annular seat will shut off the flow of fluid through the channel.

Such valve seats are commonly fabricated from such materials as fluorocarbon polymers, polyurethanes, and various olefinic polymers and copolymers. However, even the more thermally stable of these materials will fail if the valve is exposed to temperatures in excess of about 650° F. If, for example, an accident occurred which led to the outbreak of a fire in the vicinity of such a valve, because of the low heat resistance of the valve seat materials, they could be damaged to a point where their condition would be tantamount to the absence of a sealing element in the valve. If the material transported through the valve were flammable, such as petroleum hydrocarbons, leakage from the valve could contribute to the seriousness of the accident.

It is because of this that valves having elastomeric seats have not been used to transport certain materials. Recently, however, fire-tested valves have been developed which function as conventional valves having elastomeric seats to seal the valve in general service but which have features which ensure that the valve will still seal properly if exposed to a fire or extreme heat. For example, Japanese Patent Publication No. 45-32861, published Oct. 22, 1970, discloses a butterfly valve structure having an annular metal ring which is held in a retracted position by a low-melting temperature alloy. When exposed to temperatures high enough to cause damage to the elastomeric seal, the alloy melts and the annular metal ring is released to form a metal-to-metal seal with the valve disc.

Likewise, U.S. Pat. No. 4,175,578 teaches a fire resistant seat for butterfly and ball valves having a prestressed annular metal collar adjacent a valve seat. When exposed to heat, the stresses stored in the collar are released, and the collar moves into sealing relationship with the valve element to prevent leakage. Finally, U.S. Pat. No. 4,202,365 discloses a fire-tested butterfly valve structure which has both an annular flexible metal seat and an annular resilient seat. The flexible metal seat is held out of sealing contact by either a fusible washer or an integral protrusion on the resilient seat. When the resilient seat is damaged by heat, the metal seat moves into sealing relationship with the butterfly disc to prevent leakage.

However, each of the above valve structure must rely on the performance of elements separate from the privacy sealing element at elevated temperatures to bring about the operation of the secondary metal sealing element. The alloy of the Japanese publication must melt at just the right temperature as must the fusible washer of the U.S. Pat. No. 4,202,365. The stored stresses in the metal collar of the U.S. Pat. No. 4,175,578 must be released and the taper of the collar designed so that it will function at the proper moment. Accordingly, the need still exists in the art for a valve structure which will be both simple and reliable in forming a secondary metal-to-metal seal upon high temperature deterioration of a primary sealing element.

SUMMARY OF THE INVENTION

The flow control valve of the present invention may be of a type wherein a butterfly disc closure element having a tapered shoulder about its outer edge is mounted on a shaft for rotation about an axis perpendicular to the axis of the fluid flow channel. The disc element has an annular flange extending from a planar surface thereof through which the shaft passes and is attached so that rotation of the shaft causes the outer circumference of the disc to move into and out of sealing relationship with the edges of the fluid flow channel.

A resilient seat member comprising a primary sealing element partially wrapped around a resilient reinforcing member is mounted about the circumference of the fluid flow channel so that as the disc element is rotated into a closed position, the seat member seals completely around the outer edges of the disc element to cut off the flow of fluid through the valve. Because of the resiliency of the seat member, it can deform into sealing engagement with the valve disc element to promote a fluid-tight seal with the reinforcing member acting as a support for the sealing element.

Immediately adjacent the resilient seat member is an annular flexible metal seat member which also encircles the circumference of the upstream side of the fluid flow channel. The metal seat member has inner and outer edges and is held in position against the resilient seat member by gaskets which are resistant to heat and which are located on either side of the outer edge of the metal seat member. In a preferred embodiment, the metal seat member is fabricated so that it has on its inner edge an arched or convex-shaped lip portion which curves around the upstream side of the primary sealing element of the resilient seat member. That is, the lip portion is curved so that it follows the contour of the upstream side of the primary sealing member. The tip of the lip portion faces away from the resilient seat member and extends outwardly in a direction parallel to the outer edge of the valve disc element. In an alternative embodiment, the tip of the lip portion may be curved. During assembly, the metal seat is biased against the upstream side of the primary sealing element, although that sealing element normally prevents the metal seat from coming into sealing contact with the valve disc.

In an alternative embodiment of the invention, annular flexible metal seat members are positioned in back-to-back relationship immediately adjacent the resilient seat member on its upstream side. Again, heat resistant gaskets hold the metal seat members in position, and the members are biased against the upstream surface of the resilient seat member. In yet another alternative embodiment, a single annular flexible metal seat member is positioned adjacent the upstream side of the resilient seat member. The metal seat member is fabricated so that it has on its inner edge a convex-shaped lip portion, the tip of which faces the resilient seat member but which is normally held out of sealing contact with the valve disc by the resilient seat.

If the valve is exposed to a fire or other elevated temperature environment which causes the resilient seat member to melt or deform, the flexible metal seat member or members will be displaced by their inherent biasing or flexing action toward the area previously occupied by the resilient seat member. Continued exposure to heat will cause further deterioration of the resilient seat member. However, the flexible metal seat member or members will spring into contact with the edge of the valve disc closure element to form a fire and heat resistant metal-to-metal seal. Such a seal prevents leakage of potentially flammable fluids from the valve.

Accordingly, it is an object of the present invention to provide a simple but reliable fire and heat resistant valve structure capable of shutting off the flow of fluids even if the primary resilient sealing element of the valve fails to perform by providing a secondary metal-to-metal seal for the valve. This and other objects and advantages of the invention will become apparent from the following description, the accompanying drawings, and the appended claims.

BRIEF DESCRIPTION OF THE DRAWINGS

FIG. 1 is a side elevational view of a butterfly valve of the type disclosed in the present invention;

FIG. 2 is a cross-sectional view of the valve taken along line 2—2 in FIG. 1;

FIG. 3 is an enlarged cross-sectional view of the valve disc, resilient seat member, and flexible metal seat member constructed in accordance with one embodiment of the present invention;

FIG. 4 is an enlarged cross-sectional view of an alternative embodiment of the invention illustrating the valve disc, resilient seat member, and modified flexible metal seat member;

FIG. 5 is an enlarged cross-sectional view of yet another alternative embodiment of the invention illustrating the valve disc, resilient seat member, and pair of flexible metal seat members; and FIG. 6 is an enlarged cross-sectional view of an alternative embodiment of the invention illustrating the valve disc, resilient seat member, and modified flexible metal seat member.

DESCRIPTION OF THE PREFERRED EMBODIMENTS

Although the invention will be described with reference to a butterfly valve and disc arrangement, it will be apparent to those skilled in the art that the fire and heat resistant sealing elements of the present invention may be readily adapted to other types of valves such as ball valves. With reference to the drawings, which illustrate a preferred embodiment of the invention, the butterfly valve shown in FIGS. 1 and 2 includes a housing 10 which is cast from a metal such as ductile iron, an alloy of iron, aluminum, or the like. The housing 10 includes oppositely extending ear portions 12 and 14 and is provided on its opposite ends with end faces 16 and 18 which are preferably flat and in generally parallel relationship. Centrally formed within housing 10 is a generally circular fluid flow channel 20.

The valve element is disc 22 having an annular flange 24 extending from one surface thereof is mounted on shaft 26 which passes through the annular opening in flange 24 and is secured thereto by suitable means such as pins 28. Shaft 26 is secured in housing 10 by retainers 30 and 32 and is adjusted into proper position by means of bolts 34, 36, 38, and 40 which optionally may have Belleville-type washers 44 (shown only on bolt 34 for purposes of illustration). A conventional actuator (not shown) is employed to rotate shaft 26 and disc 22 between an open and a closed position.

As shown in FIGS. 2 and 3, when valve disc 22 is rotated to a closed position, its outer edge 46 sealingly engages an annular resilient seat member 48 which completely circumscribes fluid flow channel 20. Resilient seat member 48 includes a primary sealing element 50 and a resilient reinforcing member 52 supporting primary sealing element 50. The resilient seat member 48 is positioned in a recess 54 in shoulder 56 of the valve housing 10. Seat member 48 is formed by wrapping primary sealing element 50 which may be a sheet of a fluorocarbon polymer such as a perfluoroalkoxy resin around resilient reinforcing member 52 and notched annular spacing ring 58. Reinforcing member 52 may be an O-ring which can be fabricated of a resilient, elastomeric material such as Viton, a fluoroelastomer available from E. I. de Nemours. Notched annular spacing ring 58 is preferably formed of a heat resistant material such as a metal or metal alloy and may be made of the same material as housing 10.

In the embodiment shown in FIGS. 2 and 3, an annular flexible metal seat member 60 is mounted adjacent seat member 48 and is held in position by annular gaskets 62 and 64. Gaskets 62 and 64 are preferably formed of a heat resistant material such as graphite. Suitable gasket material is available under the name Grafoil from Union Carbide Corp., Danbury, Conn. A retaining disc 66 held in position by bolts 68 maintains the entire sealing assembly in proper position. The metal seat member is formed from a suitable high strength alloy which performs well at high temperatures such as Inconel X750 or other nickel alloy. Metal seat member 60 has a curved inner edge 70 which follows the contour of seat member 48 and has a generally convex-shaped lip portion 72 with an outwardly extending tip 74. As shown in FIG. 3, tip 74 faces away from seat member 48 toward the normally upstream direction of fluid flow through channel 20 and extends parallel to outer edge 46 of valve disc 22.

During assembly, metal seat 60 is biased against the upstream side of seat member 48 by retaining disc 66, although that seat member normally prevents metal seat 60 from coming into sealing contact with valve disc 22. If the valve is exposed to a fire or other elevated temperature environment which is sufficiently hot to cause resilient seat member 48 to melt or deform, flexible metal seat member 60 will be displaced by its inherent biasing or flexing action toward the area previously occupied by resilient seat member 48. Continued exposure of the valve to heat will cause further deterioration of resilient seat member 48. However, the convex lip portion 72 and tip 74 of flexible metal seat member 60 will spring into contact with the outer edge 46 of valve disc element 22 to form a fire and heat resistant metal-to-metal seal. Such a seal prevents leakage of potentially flammable fluids from the valve.

In the alternative embodiments of the invention illustrated in FIGS. 4 and 5, where like reference numerals indicate like elements, the flexible metal seat members have somewhat modified configurations. As shown in FIG. 4, flexible metal seat member 160 is positioned adjacent the upstream side of resilient seat member 48 and is held in position by heat resistant gaskets 62 and 64. Seat member 160 has a generally convex-shaped lip portion 172 with an inwardly extending tip 174, facing toward seat member 48. In operation, if seat member 48 melts or deteriorates, metal seat member 160, which has been biased to flex toward seat member 48, will move to sealingly engage the outer edge 46 of valve disc element 22.

In the embodiment illustrated in FIG. 5, flexible metal seat members 260 and 360 are positioned in back-to-back relationship immediately upstream of resilient seat member 48. Seat members 260 and 360 have generally convex-shaped lip portions 272 and 372, respectively. As shown, the tips 274 and 374 of each seat member face away from each other. Operation of the embodiment shown in FIG. 5 is substantially the same as the operation of the other described embodiments.

In the embodiment illustrated in FIG. 6, flexible seat member 460 is positioned adjacent the upstream side of resilient seat member 48 and is held in position by heat resistant gaskets 62 and 64. Seat member 460 has a generally convex-shaped lip portion 472 having an outwardly extending curved tip 474 which faces away from seat member 48. Operation of the embodiment shown in FIG. 6 is substantially the same as that illustrated in the other drawing figures.

While the apparatus herein described constitutes preferred embodiments of the invention, it is to be understood that the invention is not limited to this precise apparatus, and that changes may be made without departing from the scope of the invention, which is defined in the appended claims.

What is claimed is:

1. A flow control valve for providing a metal-to-metal seal upon the thermally induced failure of the primary sealing element, comprising in combination: a housing defining a fluid flow channel, a valve element disposed in said fluid flow channel adapted to be moved between an open and a closed position to control the flow of fluid therethrough, an annular resilient seat member circumscribing said fluid flow channel and cooperating with said valve element for sealing said fluid flow channel when said valve element is in a closed position, said annular resilient seat member including a primary sealing element and a resilient reinforcing member supporting said primary sealing element, at least one annular flexible metal seat member having a curved inner edge adapted to sealingly engage said valve disc and positioned adjacent to and biased toward said resilient seat member, and heat resistant gasket means for holding said flexible metal seat member in position so that upon melting or deterioration of said resilient seat member said curved inner edge of said flexible metal seat member springs into sealing engagement with said valve element when said valve element is in a closed position to provide a heat resistant metal-to-metal seal.

2. The flow control valve of claim 1 in which the inner edge of said at least one flexible metal seat member has a generally convex-shaped lip portion.

3. The flow control valve of claim 2 in which the tip of said lip portion faces away from said resilient seat member.

4. The flow control valve of claim 2 in which the tip of said lip portion faces toward said resilient seat member.

5. The flow control valve of claim 1 including a pair of flexible metal seat members positioned in back-to-back relationship adjacent said resilient seat member.

* * * * *